US008429448B1

(12) United States Patent
Vohra et al.

(10) Patent No.: US 8,429,448 B1
(45) Date of Patent: Apr. 23, 2013

(54) SYSTEMS AND METHODS FOR DYNAMIC TRANSACTION MIGRATION IN AN EVENT-DRIVEN, MULTI-SILO ARCHITECTURE

(75) Inventors: Anuj Vohra, Johns Creek, GA (US); Nikhil Sarathi, Cumming, GA (US)

(73) Assignee: McKesson Financial Holdings Limited, Hamilton (BM)

( * ) Notice: Subject to any disclaimer, the term of this patent is extended or adjusted under 35 U.S.C. 154(b) by 373 days.

(21) Appl. No.: 12/965,511

(22) Filed: Dec. 10, 2010

(51) Int. Cl.
*G06F 11/00* (2006.01)
(52) U.S. Cl.
USPC .................................................. 714/4.2
(58) Field of Classification Search ............. 714/4.2
See application file for complete search history.

(56) References Cited

U.S. PATENT DOCUMENTS

| | | | |
|---|---|---|---|
| 5,892,818 A | 4/1999 | Lee | |
| 6,456,624 B1 | 9/2002 | Eccles et al. | |
| 7,114,158 B1 | 9/2006 | Thompson et al. | |
| 8,327,020 B1 | 12/2012 | Sarathi et al. | |
| 2002/0035606 A1 | 3/2002 | Kenton | |
| 2004/0199926 A1 | 10/2004 | Gilgen et al. | |
| 2005/0188107 A1* | 8/2005 | Piercey et al. | 709/238 |
| 2005/0288964 A1 | 12/2005 | Lutzen et al. | |
| 2011/0247003 A1 | 10/2011 | Fong et al. | |
| 2012/0060062 A1 | 3/2012 | Lin et al. | |
| 2012/0060165 A1* | 3/2012 | Clarke | 718/104 |

OTHER PUBLICATIONS

Notice of Allowance for U.S. Appl. 12/893,546 mailed Oct. 11, 2012.
Non-Final Office Action for U.S. Appl. No. 12/893,546 mailed Aug. 1, 2012.
Matt Welsh; SEDA: an Architecture for WellConditions, Scalabe Internet Services; ACM 2001; 20 pages.
Matt Welsh; The Staged Event-Driven Architecture for Highly-Concurrent Server Applications; Qualifying Examination Proposal, Nov., 2000; 26 pages.
Non-Final Office Action for U.S. Appl. No. 12/893,693 mailed Feb. 6, 2013.

\* cited by examiner

*Primary Examiner* — Bryce Bonzo
(74) *Attorney, Agent, or Firm* — Sutherland Asbill & Brennan LLP (57) ABSTRACT

Systems and methods may include providing a first silo configured to operate a first set of event-driven processing stages, and a second silo configured to operate a second set of event-driven processing stages; arranging at least one shared transaction cache between the first set of processing stages and the second set of processing stages of the respective first and second silos, where each processing stage of the first and second sets of processing stages can obtain or receive one or more transactions from the at least one shared transaction cache for processing, and where when a distressed processing stage in the first silo fails to process a first transaction designated for the distressed processing stage in a predefined amount of time, a non-distressed processing stage in the second silo obtains or receives the first transaction from the at least one shared transaction cache to process the first transaction on behalf of the distressed processing stage.

20 Claims, 8 Drawing Sheets

SYSTEMS AND METHODS FOR DYNAMIC TRANSACTION MIGRATION IN AN EVENT-DRIVEN, MULTI-SILO ARCHITECTURE

FIELD OF THE INVENTION

Aspects of the invention relate generally to dynamic transaction migration, and more specifically, to systems and methods for dynamic transaction migration in an event-driven, multi-silo architecture when one or more silos are distressed or not operating appropriately.

BACKGROUND OF THE INVENTION

A silo architecture can be a replicated hardware/software configuration. The application hosted on these silos can be a staged, event-driven application. A problem occurs if one of the stages in a silo hangs, and the load balancer, which is application agnostic, is not able to assess the situation and continues to the send the transactions to the disabled silo with the downed stage. The transactions will be processed by the disabled silo until they reach the downed stage. This situation will cause exponential degradation in the performance of the silo and the loss of the transactions being routed through the disabled silo. Eventually this disabled silo will have to be shut down and corrected; however, shutting down the silo will result in a loss of transactions that have already been fed by the load balancer to the silo. The loss of any transactions is not desirable and may result in complaints and dissatisfied customers.

Thus, there is an opportunity for systems and methods for dynamic transaction migration in an event-driven, multi-silo architecture.

SUMMARY OF THE INVENTION

Some or all of the above needs and/or problems may be addressed by certain embodiments of the invention.

In one embodiment, there is a computer-implemented method. The method may include: providing a first silo comprising a first cluster of one or more first computers configured to operate a first set of event-driven processing stages; providing a second silo comprising a second cluster of one or more second computers configured to operate a second set of event-driven processing stages, wherein the first and second sets of processing stages include substantially identical processing stages such that during normal operations of the first and second silos, transactions are allocated between the first and second silos; arranging at least one shared transaction cache between the first set of processing stages and the second set of processing stages of the respective first and second silos, wherein the at least one transaction cache stores one or more transactions designated for processing by respective processing stages of the first set or the second set, wherein each processing stage of the first and second sets of processing stages can obtain or receive one or more transactions from the at least one shared transaction cache for processing, wherein when a distressed processing stage in the first silo fails to process a first transaction designated for the distressed processing stage in a predefined amount of time, a non-distressed processing stage in the second silo obtains or receives the first transaction from the at least one shared transaction cache to process the first transaction on behalf of the distressed processing stage.

In accordance with another embodiment of the invention, there is a system. The system may include at least one memory operable to store computer-executable instructions, and at least one processor configured to access the at least one memory. The at least one processor may be further configured to execute the computer-executable instructions to: provide a first silo comprising a first cluster of one or more first computers configured to operate a first set of event-driven processing stages; provide a second silo comprising a second cluster of one or more second computers configured to operate a second set of event-driven processing stages, wherein the first and second sets of processing stages include substantially identical processing stages such that during normal operations of the first and second silos, transactions are allocated between the first and second silos; arrange at least one shared transaction cache between the first set of processing stages and the second set of processing stages of the respective first and second silos, wherein the at least one transaction cache stores one or more transactions designated for processing by respective processing stages of the first set or the second set, wherein each processing stage of the first and second sets of processing stages can obtain or receive one or more transactions from the at least one shared transaction cache for processing, wherein when a distressed processing stage in the first silo fails to process a first transaction designated for the distressed processing stage in a predefined amount of time, a non-distressed processing stage in the second silo obtains or receives the first transaction from the at least one shared transaction cache to process the first transaction on behalf of the distressed processing stage.

BRIEF DESCRIPTION OF THE DRAWINGS

Reference will now be made to the accompanying drawings, which are not necessarily drawn to scale, and wherein.

DETAILED DESCRIPTION

Example embodiments of invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the invention may be directed to systems and methods for dynamic transaction migration in an event-driven, multi-silo architecture. The event-driven, multi-silo architecture may include one or more data centers, which each may be located at respective geographical locations. For example, a first data center may be located in a first geographical location, and a second data center may be located in a second geographical location different from the first geographical location. Each data center can include a plurality of silos, where each silo may provide substantially the same processing capabilities in order to provide for load-balancing at a data center. Each silo in a data center may include a respective plurality of processing stages, which may be arranged in one or more respective sequential orders, according to an example embodiment of the invention. In an example sequential order, a later processing stage may be dependent upon the processing output of an earlier processing stage.

An example messaging service, such as Java Messaging Service (JMS), can be utilized with the respective processing stages to provide one or more asynchronous communications channels (e.g., a JMS bus) so that the processing stages can operate asynchronously with respect to each other. For example, to provide one or more asynchronous communications channels for a silo, an example messaging service may provide a communications bus that carries or coordinates the flow of events through various processing stages. In this regard, the example messaging service may provide or facilitate the provisioning of queues, including request queues and/or output queues, which may be shared between corresponding processing stages in different silos. To allow for a shared queue (e.g., a shared request queue) between corresponding processing stages in different silos, one or more common transaction caches may be commonly utilized or accessible between or among the different silos. The common transaction cache may be implemented in random access memory (RAM), a database, or another storage means. Accordingly, the common transaction cache enables respective processing stages of the silos to store results of processing in the common transaction cache, such that a next stage can obtain the appropriate transaction and context information for processing. As described herein, a stage in one silo may generally obtain and process only those transactions that are designated for the particular stage in a particular silo. However, upon determination that a corresponding stage in another silo is disabled, downed, hung, or not functioning properly or timely, a stage in one silo may process one or more transactions on behalf of the disabled, downed, hung, or not functioning stage in another silo. Accordingly, example dynamic transaction migration may allow for a transaction designated for a processing stage in one silo to be migrated to another silo for processing by a corresponding processing stage.

During operation, an event-driven system may receive a transaction request from an external event source computer. The event-driven system may deliver, perhaps via one or more load-balancer computers, the transaction request to a particular silo of a plurality of silos in a data center. At a particular silo, an input gateway computer can deliver the received transaction request to the shared transaction cache. The delivery of the transaction request into the shared transaction cache may be an "event" that triggers or results in the first processing stage processing the transaction request and then delivering its output to the shared transaction cache for processing by a next processing stage in the silo. Any number of processing stages may be present in a silo between the first processing stage and the last processing stage. As such, the output of one stage is provided to the request queue of the next processing stage for processing as a respective event. If no processing stage in a silo is disabled, downed, hung, or not functioning properly or timely, then when the last processing stage in the silo is reached, the output of the last processing stage may be communicated to one or more external service computers as a system-level output. On the other hand, if a processing stage in a particular silo is disabled, downed, hung, or not functioning properly or timely, then the transaction can be migrated to another silo to finish processing, as described herein. The output of the last processing stage of the other silo may be communicated to one or more external service computers as a system-level output. When a response is received from an external service computer, it may be processed as necessary by the functioning silo, and the response may be delivered to the external event source computer that originated the request.

System Overview

Figure 1A:
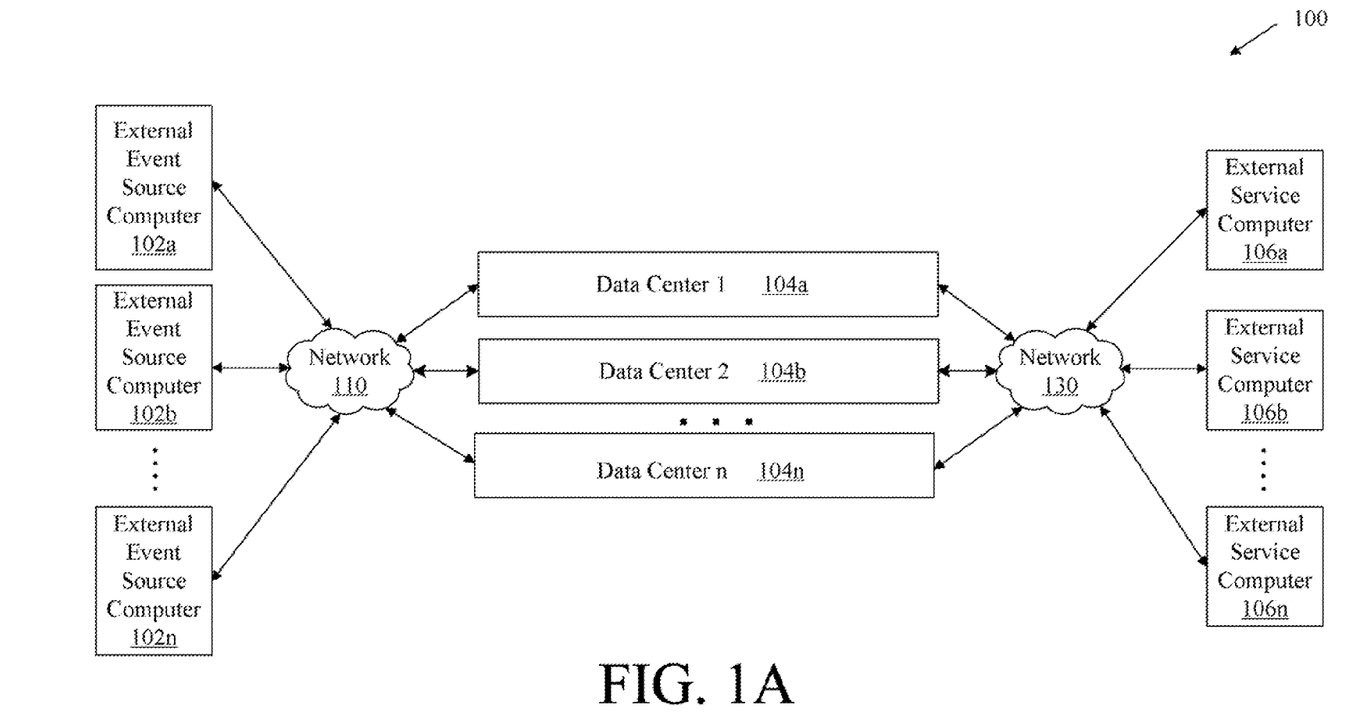
FIG. 1A is a block diagram of an example event-driven, multi-silo architecture that supports dynamic transaction migration according to an example embodiment of the invention.

FIG. 1A illustrates an example real-time and event-driven, multi-silo architecture system 100 that supports example dynamic transaction migration, according to an example embodiment of the invention. As shown in FIG. 1, the system 100 may include one or more external event source computers 102*a-n*, data centers 104*a-n*, and/or external service computers 106*a-n*, which are each configured for accessing and reading associated computer-readable media having stored thereon data and/or computer-executable instructions for implementing the various methods described herein. Generally, network devices and systems, including the one or more external event source computers 102*a-n*, data centers 104*a-n*, and external service computers 106*a-n* have hardware and/or software for transmitting and receiving data and/or computer-executable instructions over a communications link and at least one memory for storing data and/or computer-executable instructions. These network devices and systems may also include one or more processors for processing data and executing computer-executable instructions, as well as other internal and peripheral components that are well-known in the art. As used herein, the term "computer-readable medium" may describe any form of computer memory or memory device.

As shown in FIG. 1A, one or more external event source computers 102*a-n* may communicate with one or more data centers 104*a-n* via a network 110, and one or more data centers 104*a-n* may communicate with one or more external service computers 106*a-n* via a network 130. In an example embodiment, each of the networks 110, 130 may include one or more separate or shared private and/or public networks, including the Internet. Although illustrated separately, the networks 110, 130 can also be the same network as well without departing from example embodiments of the invention. Each of these components—the external event source computers 102*a-n*, the data centers 104*a-n*, the external service computers 106*a-n*, and the networks 110, 130—will now be discussed in further detail.

First, an external event source computer 102*a-n* may be associated with any respective source entity from which a data center 104*a-n* receives one or more transaction requests that trigger event-based transaction processing by one or more data centers 104*a-n*. In an example embodiment of the invention, the transaction requests may be associated with healthcare transactions such as eligibility requests, preauthorization requests, claim status requests, and the like. For healthcare transactions, a respective event source computer 102a-n may be associated with or operated by a pharmacy, a physician, a clinic/hospital, or yet another healthcare provider. It will be appreciated that the source entity can be virtually any entity from which a data center 104 receives one or more transaction requests (e.g., for real-time processing or routing), according to an example embodiment of the invention.

Figure 1B:
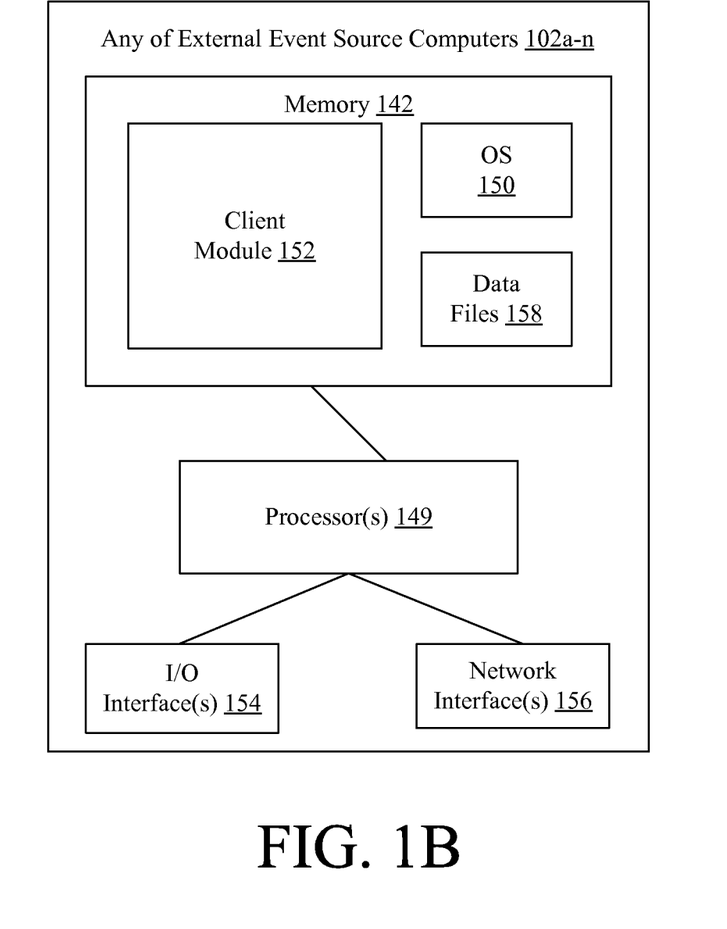
FIG. 1B illustrates an example implementation of an external event source computer, according to an example embodiment of the invention.

FIG. 1B illustrates an example implementation of an external event source computer 102a-n, according to an example embodiment of the invention. As shown in FIG. 1B, an example external event source computer 102a-n may be any processor-driven device, such as, but not limited to, a server computer, a mainframe computer, one or more networked computers, a desktop computer, a personal computer, a laptop computer, a mobile computer, a handheld portable computer, a digital assistant, a personal digital assistant, a digital tablet, an Internet appliance, or any other processor-based device. In addition to having processor(s) 149, an example external event source computer 102a-n may further include at least one memory 142, input/output ("I/O") interface(s) 154, and network interface(s) 156. The memory 142 may be any computer-readable medium, coupled to the processor(s) 149, such as RAM, ROM, and/or a removable storage device for storing data files 158 and a database management system ("DBMS") to facilitate management of data files 158 and other data stored in the memory 142 and/or stored in separate databases. The memory 142 may also store various program modules, such as an operating system ("OS") 150 and a client module 152. The OS 150 may be, but is not limited to, Microsoft Windows®, Apple OSX™, Linux, Unix, or a mainframe operating system. The client module 152 may be an Internet browser or other software, including a dedicated program, for interacting with a data center 104.

For example, a user such as a physician, physician assistant, or other healthcare provider employee may utilize the client module 152 to initiate or direct a healthcare transaction request (e.g., eligibility request, claim status request, referral/preauthorization request, medical claim request, etc.) to a data center 104 for routing to an external service computer 106a-n for processing, where the external service computer 106a-n may be a claims processor computer, an insurance company computer, a government payor-affiliated computer, a third-party payor computer, and the like. Likewise, the client module 152 may be used to receive data and/or healthcare transaction responses from a data center 104 or external service computer 106a-n. Similarly, a user such as a pharmacist or pharmacy employee may utilize the client module 152 to initiate or direct a healthcare transaction request (e.g., eligibility request, claim status request, preauthorization request, prescription claim request, etc.) to a data center 104 for routing to an external service computer 106a-n for processing, where the external service computer 106a-n may be a pharmacy benefits manager (PBM) computer, an insurance company computer, a government payor-affiliated computer, another third-party payor computer, or a claims processor computer, according to an example embodiment of the invention.

Second, in the system 100 of FIG. 1A, there may be one or more data centers 104a-n, which each may be physically located at respective geographical locations. One or more of the data centers 104a-n may include a plurality of silos. The respective application hosted on these silos can be a staged, event-driven application, where each stage operates asynchronously. The configuration of the silos may be in a replicated hardware/software configuration that is arranged in a way that if one of the silos were taken offline (e.g., failure, new deployment, etc.), the clients of the application such as the one or more external event source computers 102a-n or external service computers 106a-n may not see any significant or material functional deficiency. An example operation and configuration of a data center 104a-n will be discussed in further detail below with respect to FIG. 2.

Third, the external service computer 106a-n may be associated with any entity with which one or more data centers 104 communicate transactions requests for processing, and from which one or more responses that indicate a result of the processing may be received, according to an example embodiment of the invention. In an example embodiment of the invention, the transaction requests may be associated with healthcare transactions such as eligibility requests, preauthorization requests, claim status requests, and the like. For healthcare transactions, the external service computer 106a-n may be associated with or operated by a claims processor, an insurance company, a pharmacy benefits manager ("PBM"), a government payor, a discount processor, a third-party payor, or the like, according to an example embodiment of the invention. According to an alternative example embodiment of the invention, an external service computer 106a-n may also be implemented as part of a data center 104a-n or may otherwise be affiliated with a data center 104a-n.

Figure 1C:
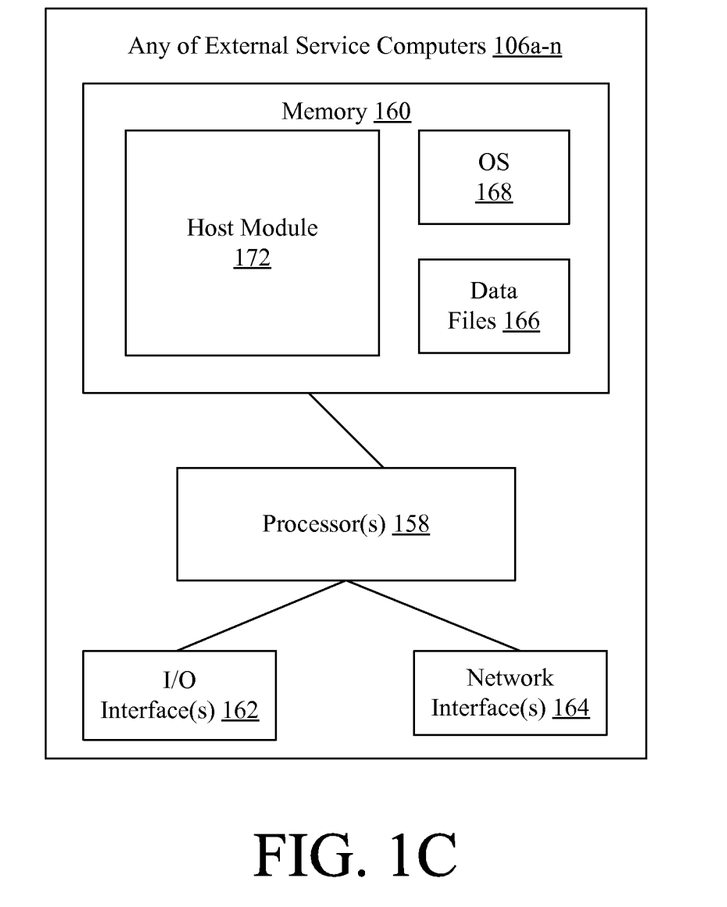
FIG. 1C illustrates an example implementation of an external service computer, according to an example embodiment of the invention.

FIG. 1C illustrates an example implementation of an external service computer 106a-n, according to an example embodiment of the invention. The external service computer 106a-n may be any processor-driven device, such as, but not limited to, a server computer, a mainframe computer, one or more networked computers, a desktop computer, a personal computer, a laptop computer, a mobile computer, a handheld portable computer, a digital assistant, a personal digital assistant, a digital tablet, an Internet appliance, or any other processor-based device. The external service computer 106a-n may include processor(s) 158, at least one memory 160, input/output ("I/O") interface(s) 162, and network interface(s) 164. The memory 160 may be any computer-readable medium, coupled to the processor 158, such as RAM, ROM, and/or a removable storage device for storing data files 166 and a database management system ("DBMS") to facilitate management of data files 166 and other data stored in the memory 160 and/or stored in separate databases. The memory 160 may also store various program modules, such as an operating system ("OS") 168 and a host module 172. The OS 168 may be, but is not limited to, Microsoft Windows®, Apple OSX™, Linux, Unix, or a mainframe operating system. The host module 172 may receive, process, and respond to healthcare transaction requests from a data center 104 (e.g., a processing computer 305a-n, as discussed herein) or external event source computer 102a-n, respectively.

Each of the networks 110, 130 may include any telecommunication and/or data network, whether public, private, or a combination thereof, including a local area network, a wide area network, an intranet, an internet, the Internet, intermediate handheld data transfer devices, a publicly switched telephone network (PSTN), and/or any combination thereof and may be wired and/or wireless. The network 110 may also allow for real-time or near real-time transactions and responses to be transmitted between one or more external event source computers 102a-n and one or more data centers 104a-n. Similarly, the network 130 may allow for real-time or near real-time transactions and/or responses to be transmitted between one or more external service computers 106a-n and one or more data centers 104a-n. Due to network connectivity, various methodologies as described herein may be practiced in the context of distributed computing environments.

Those of ordinary skill in the art will appreciate that the system 100 shown in and described with respect to FIG. 1 is provided by way of example only. Numerous other operating environments, system architectures, and device configurations are possible. Accordingly, embodiments of the invention should not be construed as being limited to any particular operating environment, system architecture, or device configuration.

Figure 2:
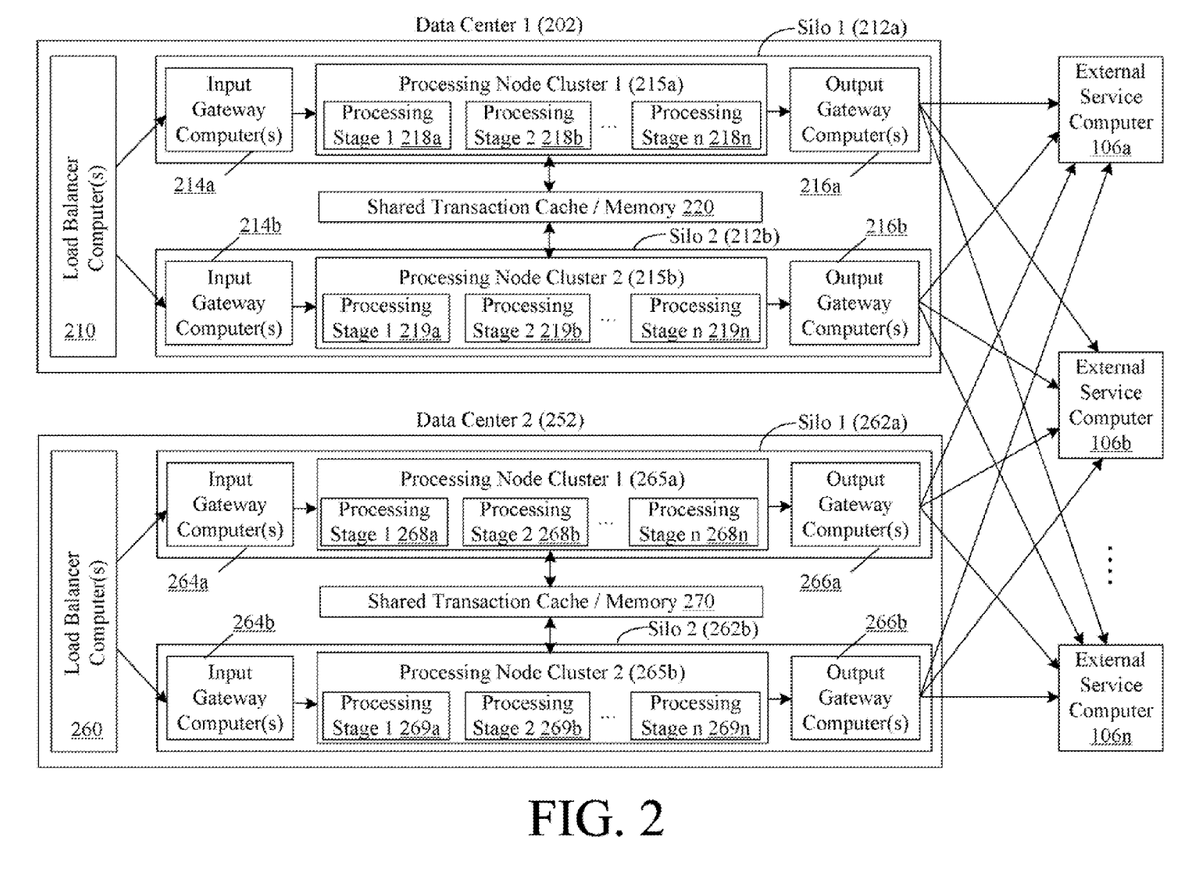
FIG. 2 illustrates an example implementation of example data centers of FIG. 1, according to an example embodiment of the invention.

FIG. 2 illustrates an example implementation of example data centers 202, 252. Either of the example data centers 202, 252 can be representative implementations of the data centers 104a-n in FIG. 1A. Each of the data centers 202, 252 can likewise be physically located at respective geographical locations. For example, data centers 202, 252 may be at respective locations geographically dispersed across the United States.

In FIG. 2, the first data center 202 may include a load balancer computer 210 and a plurality of silos 212a, 212b. The plurality of silos 212a, 212b may be configured as replicated silos such that each of the plurality of silos 212a, 212b has substantially the same software functionality. In an example embodiment, each of the plurality of silos 212a, 212b may also have substantially the same hardware components and configuration as well. While only two silos 212a, 212b are illustrated, it will be appreciated that more than two silos may be available at the first data center, according to an example embodiment of the invention.

The load balancer computer 210 for the first data center 202 may be operative to allocate transaction requests received by the first data center 202 from an external computer such as external event source computer 102a-n between or among the available silos 212a, 212b. Similarly, the load balancer computer 260 for the second data center 252 may be operative to allocate transaction requests received by the second data center 252 from an external computer such as external event source computer 102a-n between or among the available silos 262a, 262b.

Each silo 212a, 212b, 262a, 262b may have gateway computers such as respective input gateway computers 214a, 214b, 264a, 264b, and respective output gateway computers 216a, 216b, 266a, 266b. In addition, each silo 212a, 212b, 262a, 262b may have respective processing node clusters 215a, 215b, 265a, 265b. At the first data center 202, the input gateway computer 214a for the first silo 212a may facilitate the delivery of communications (e.g., transaction requests, responses, etc.) between the load balancer computer 210 and processing node cluster 215a of the first silo 212a. In addition, if needed, the input gateway computer 214a of the first silo 212a can also communicate with the input gateway computer 214b and/or the processing node cluster 215b of the second silo 212b. The output gateway computer 216a for the first silo 212a may facilitate the delivery of communications between the processing node cluster 215a and one or more external service computers 106a-n. Similarly, the input gateway computer 214b for the second silo 212b may facilitate the delivery of communications between the load balancer computer 210 and the processing node cluster 215b of the second silo 212b. In addition, if needed, the input gateway computer 214b of the second silo 212a can also communicate with the input gateway computer 214a and/or the processing node cluster 215a of the first silo 212a. The output gateway computer 216b for the second silo 212b may facilitate the delivery of communications between the processing node cluster 215b and one or more external service computers 106a-n.

Likewise, at the second data center 252, the input gateway computer 264a for the first silo 262a may facilitate the delivery of communications (e.g., transaction requests, responses, etc.) between the load balancer computer 260 and the processing node cluster 265a of the first silo 262a. In addition, if needed, the input gateway computer 264a of the first silo 262a can also communicate with the input gateway computer 264b and/or the processing node cluster 265b of the second silo 262b. The output gateway computer 266a for the first silo 262a may facilitate the delivery of communications between the processing node cluster 265a and one or more external service computers 106a-n. Similarly, the input gateway computer 264b for the second silo 262b may facilitate the delivery of communications between the load balancer computer 260 and the processing node cluster 265b of the second silo 262b. In addition, if needed, the input gateway computer 264b of the second silo 262b can also communicate with the input gateway computer 264a and/or the processing node cluster 265a of the first silo 262a. The output gateway computer 266b for the second silo 262b may facilitate the delivery of communications between the processing node cluster 265b and one or more external service computers 106a-n.

As shown in FIG. 2, at the first data center 202, there may be at least one shared transaction cache/memory 220 that is accessible by or shared between the silos 212a, 212b, including the processing node clusters 215a, 215b. The shared transaction cache/memory 220 may be implemented in random access memory (RAM), a database, or other storage means. The shared transaction cache/memory 220 may be accessed by processing node clusters 215a, 215b directly or via one or more computers associated with the first silo 212a, second silo 212b, or data center 202. Likewise, at the second data center 252, there may be at least one shared transaction cache/memory 270 that is shared or otherwise accessible by the silos 262a, 262b, including the processing node clusters 265a, 265b. The shared transaction cache/memory 270 may be implemented in RAM, a database, or other storage means. The shared transaction cache/memory 270 may be accessed by processing node clusters 265a, 265b directly or via one or more computers associated with the first silo 262a, the second silo 262b, or the data center 252.

For the first data center 202, the shared transaction cache/memory 220 may allow for one or more shared queues (e.g., a shared request queue and/or output queue) to be utilized between corresponding processing stages 218a-n, 219a-n in respective silos 212a, 212b of a first data center 202. For example, first processing stages 218a, 219a may share a common request queue and/or output queue; second processing stages 218b, 219b may share a common request queue and/or output queue; and the nth processing stages 218n, 219n may share a common request queue and/or output queue. These various request queues and/or output queues may reside in a common transaction cache/memory 220, or in respective portions thereof. In this regard, the shared transaction cache/memory 220 may enable processing stages 218a-n (and/or gateway computers 214a, 216a) of silo 212a and processing stages (and/or gateway computers 214b, 216b) of silo 212b to store results of processing in the common transaction cache, such that a next processing stage can obtain the appropriate transaction and context information for processing. Context information can incorporate information resulting from processing of prior stages, including one or more parameter values that are to be operated when processing a transaction by a processing stage. To coordinate the flow of events and transactions through the various processing stages 218a-n or 219a-n, there may be an example messaging service such as JMS (e.g., implemented as EMS) utilized by the data center 202. The example messaging service may coordinate the storage, access, and delivery of transactions from or to the various processing stages 218a-n and 219a-n. For example, the example messaging service may coordinate the delivery of transactions for processing by the various processing stages 218a-n or 219a-n. Likewise, the example messaging service may deliver results of processing by various processing stages 218a-n or 219a-n into the shared transaction cache/memory 220 for ready processing by a next stage.

Likewise, for the second data center 252, the shared transaction cache/memory 270 may allow for a shared queue (e.g., a shared request queue and/or output queue) to be utilized by corresponding processing stages 268a-n, 269a-n in different silos 262a, 262b of a second data center 252. For example, first processing stages 268a, 269a may share a common request queue and/or output queue; second processing stages 268b, 269b may share a common request queue and/or output queue; and the nth processing stages 268n, 269n may share a common request queue and/or output queue. These various request queues and/or output queues may reside in a common transaction cache/memory 270, or in respective portions thereof. In this regard, the shared transaction cache/memory 270 may enable processing stages 268a-n (and/or gateway computers 264a, 266a) of silo 262a and processing stages (and/or gateway computers 264b, 266b) of silo 262b to store results of processing in the common transaction cache, such that a next processing stage can obtain the appropriate transaction and context information for processing. To coordinate the flow of events and transactions through the various processing stages 268a-n or 269a-n, there may be an example messaging service such as JMS (e.g., implemented as EMS) utilized by the data center 252. The example messaging service may coordinate the storage, access, and delivery of transactions from or to the various processing stages 268a-n and 269a-n. For example, the example messaging service may coordinate the delivery of transactions for processing by the various processing stages 268a-n or 269a-n. Likewise, the example messaging service may deliver results of processing by various processing stages 268a-n or 269a-n into the shared transaction cache/memory 270 for ready processing by a next stage.

In an example embodiment, the processing stages 218a-n, 219a-n for a respective processing node cluster 215a, 215b may be arranged in one or more sequential orders such that the later processing stage performs processing based upon a result of processing from an earlier stage. The respective shared transaction cache/memory 220 may be utilized by one or more example messaging services to provide one or more asynchronous communications channels for controlling, directing, or synchronizing the flow of events or requests through the plurality of processing stages 218a-n, 219a-n. As such, a processing stage 218a-n, 219a-n can retrieve a next transaction request or event for processing from a shared request queue provided by the shared transaction cache/memory 220, and deliver its result of processing the request to a shared request queue of the next processing stage 218a-n, 219a-n. The delivery of a request to the request queue of the next processing stage 218a-n, 219a-n may be an event that triggers a request for processing by the next processing stage 218a-n, 219a-n. Optionally, the synchronous communications channel may provide one or more shared output queues in the shared transaction cache/memory 220 for one or more processing stages 218a-n, 219a-n to receive a result of the processing of the corresponding processing stage 218a-n, 219a-n. If output queues are utilized, then the asynchronous communications channel may obtain results of processing from a shared output queue of a processing stage 218a-n and deliver the results to a shared request queue of a subsequent processing stage 218a-n. While the discussion has focused primarily on processing stages 218a-n, 219a-n and shared transaction cache/memory 220, the discussion is equally applicable to processing stages 268a-n, 269a-n and shared transaction cache/memory 270, according to an example embodiment of the invention.

It will also be appreciated that the load balancer computers 210, 260 and the gateway computers may be implemented using similar processors, memories, and components previously described with respect to the computers in FIG. 1B or 1C. While FIG. 2 is illustrated with respect to data centers 202, 252, these data centers may be representative of other data centers within data centers 104a-n illustrated in FIG. 1A. In addition, it will be appreciated that the example implementations for data centers 202, 252 in FIG. 2 are illustrative, and many variations thereof are available without departing from example embodiments of the invention. For example, there may be more than two data centers without departing from example embodiments of the invention.

Figure 3A:
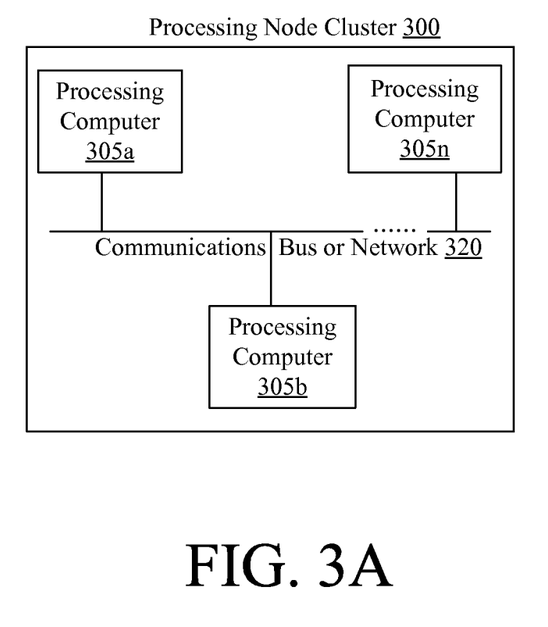
FIG. 3A illustrates an example implementation of an example processing node cluster illustrated in FIG. 2, according to an example embodiment of the invention.

FIG. 3A illustrates an example implementation of an example processing node cluster 300, according to an example embodiment of the invention. The example processing node cluster 300 may be utilized as an example implementation of any of the processing node clusters 215a, 215b, 265a, 265b illustrated in FIG. 2, according to an example embodiment of the invention.

In FIG. 3A, the example processing node cluster 300 may include one or more processing computers 305a-n, each of which may include, but are not limited to, any processor-driven device that is configured for operating one or more processing stages in an event-driven system. One or more of the processing computers 305a-n of a data center 104 may include, but are not limited to, a server computer, a mainframe computer, one or more networked computers, or any other processor-based device. In an example embodiment of the invention, the processing computers 305a-n may be coupled to or networked by a communications bus or network 320, according to an example embodiment of the invention. In this regard, various ones of the processing computers 305a-n may be involved as events and transactions are processed according to various processing stages in the event-driven system, according to an example embodiment of the invention.

Figure 3B:
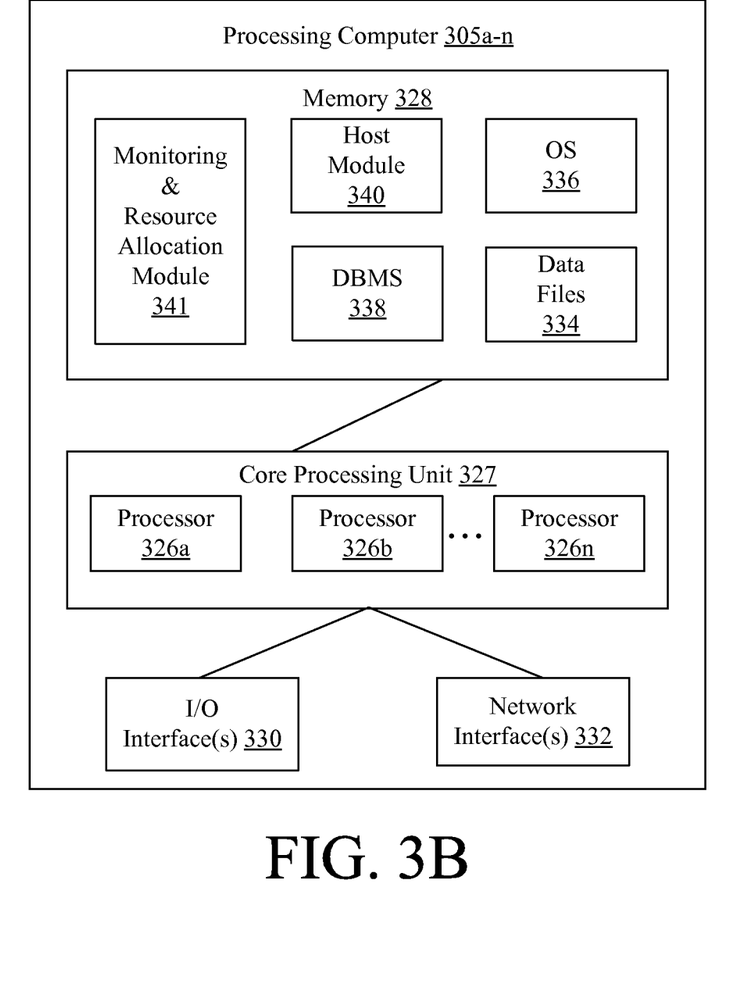
FIG. 3B illustrates an example processing computer that may be utilized with the example processing node cluster of FIG. 3A, according to an example embodiment of the invention.

FIG. 3B illustrates an example processing computer 305a-n of a processing node cluster 300 of a particular silo, according to an example embodiment of the invention. An example one of the processing computers 305a-n may include a core processing unit 327 having one or more processors 326a-n. A processing computer 305a-n may also include at least one memory 328, input/output ("I/O") interface(s) 330, and network interface(s) 332. The memory 328 may be any computer-readable medium, coupled to the processor(s) 326, such as RAM, ROM, and/or a removable storage device for storing data files 334 and a database management system ("DBMS") 338 to facilitate management of data files 334 and other data stored in the memory 328 and/or stored in one or more databases. The data files 334 may also store routing tables for determining the destination of communications received from the external event source computer 102a-n and/or the external service computer 106a-n. The memory 328 may also store various program modules, such as an operating system ("OS") 336 and the host module 340. The OS 336 may be, but is not limited to, Microsoft Windows®, Apple OSX™, Linux, Unix, or a mainframe operating system. The host module 340 may receive, process, and respond to requests from the client module 152 of the external event source computer 102a-n, and may further receive, process, and respond to requests from the host module 172 of the external service computer 106a-n. The host module 340 may also be configured to operate with an asynchronous communications channel and/or access the shared transaction cache or memory, according to an example embodiment of the invention. For example, the asynchronous communications channel may be provided by an example messaging service such as JMS, which can operate with the shared transaction cache or memory, as described herein.

It will be appreciated that each processing computer 305a-n may operate in accordance with a real-time, event-driven system, according to an example embodiment. In this regard, each processing computer 305a-n may provide processing supporting all or a portion of a plurality of processing stages arranged in one or more sequential orders in a particular silo. The memory 328 of a processing computer 305a-n may also include a monitoring & resource allocation module 341. The monitoring & resource allocation module 341 may be operative to auto-balance one or more processing stages that may be overloaded or underloaded. In an example embodiment, the monitoring & resource allocation module 341 may be configured to monitor the processing power or hardware resource utilization (e.g., queue length, processor utilization, and/or memory utilization) of one or more of the processing stages. Based at least in part on the monitored processing power or hardware resource utilization, the monitoring & resource allocation module 341 may determine whether a processing stage is under-utilized or over-utilized. For one or more under-utilized or over-utilized processing stages, the monitoring & resource allocation module 341 may modify the processing power or allocation of hardware resources associated to one or more processing stages.

Operational Overview

Figure 4:
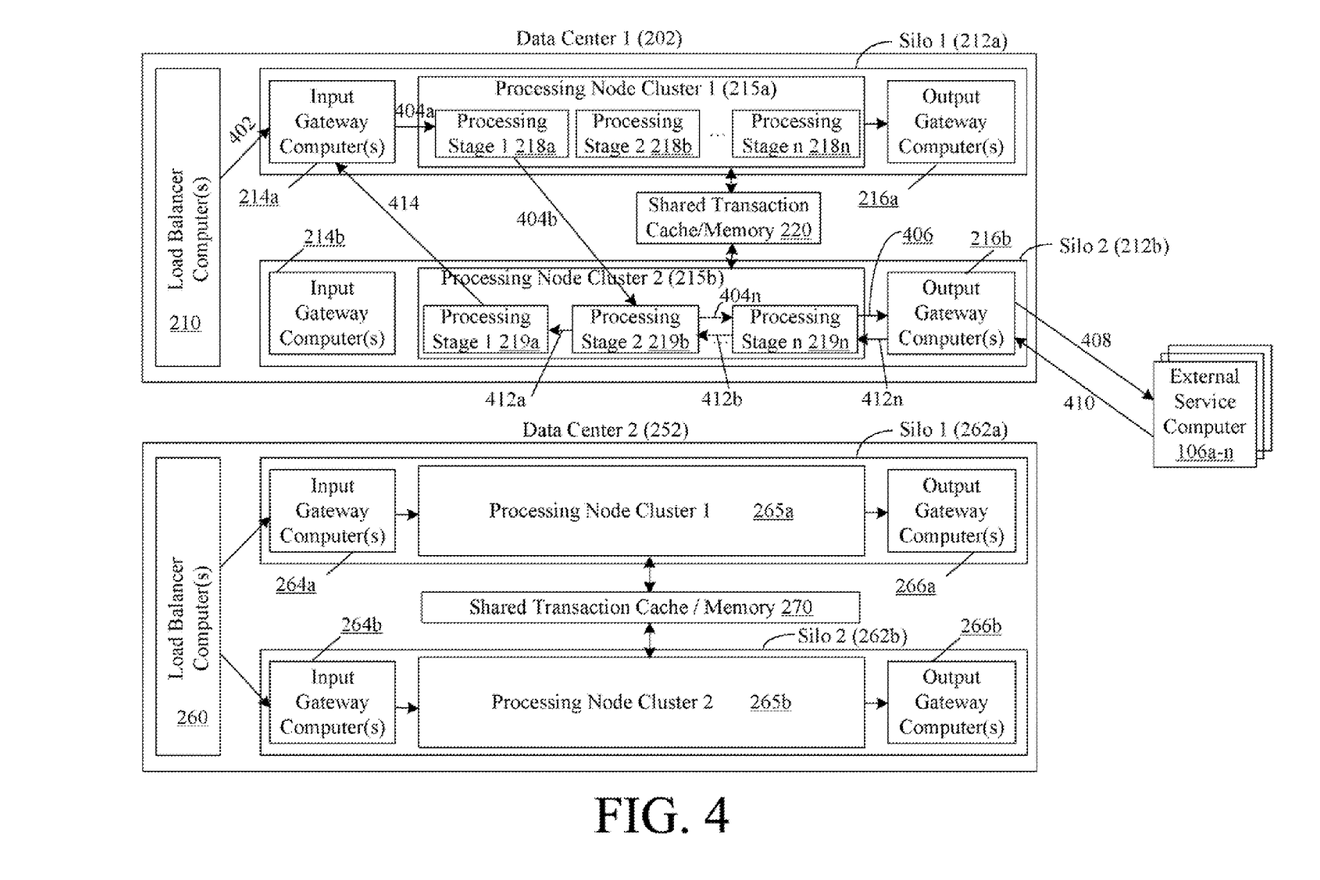
FIG. 4 illustrates an example data flow in accordance with example dynamic transaction migration between example silos, according to an example embodiment of the invention.
Figure 5:
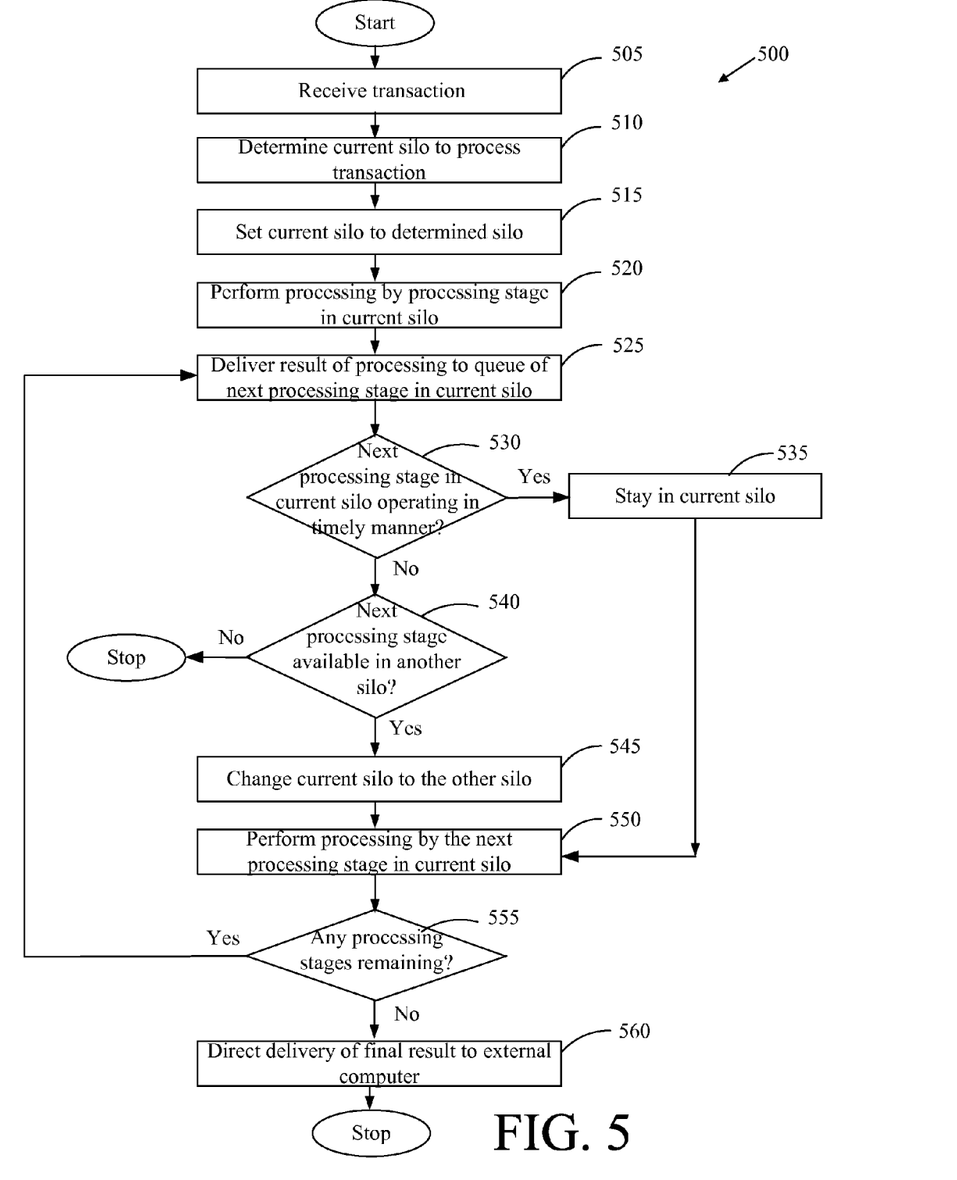
FIG. 5 illustrates a flow diagram of an example process for dynamic transaction migration in an example event-driven, multi-silo architecture, according to an example embodiment of the invention.

FIG. 4 illustrates an example data flow in accordance with example dynamic transaction migration between example silos, according to an example embodiment of the invention. FIG. 5 illustrates a flow diagram of an example process for dynamic transaction migration in an example event-driven, multi-silo architecture, according to an example embodiment of the invention. The data flow of FIG. 4 will be discussed in conjunction with the flow diagram of FIG. 5.

Turning now to FIGS. 4 and 5, processing may begin with block 505. At block 505, an external event source computer 102a-n may deliver a transaction request to a data center such as data center 202. The load balancer computer 210 may receive the transaction request. At block 510, the load balancer computer 210 may determine which of the plurality of silos 212a, 212b should process the transaction request. It will be appreciated that the load balancer computer 210 may select between or among the plurality of silos 212a, 212b by determining the processing status of the silos 212a, 212b, including functional status, distressed/disabled status, and the like. In general, a functional silo of the plurality of silos 212a, 212b may be selected based upon one or more load-balancing algorithms, according to an example embodiment of the invention.

Following block 510 is block 515. At block 515, the current silo for processing the transaction request can be set to the silo selected at block 510. Accordingly, the load balancer computer 210 may deliver the transaction request to the selected one of the silos 212a, 212b. In FIG. 4, the first silo 212a was selected, and the load balancer computer 210 delivered a transaction request 402 to the first silo 212a. However, it will be appreciated that in other embodiments, the load balancer computer 210 could have delivered the transaction request to the second silo 212b, or any other silo in data center 202, without departing from example embodiments of the invention.

Still referring to block 515, the input gateway computer 214a in the first silo 212a may receive the transaction request 402, and may route or otherwise deliver the transaction request 404a to the first processing node cluster 215a, and in particular, to the first processing stage 218a of the processing node cluster 215a. In an example embodiment of the invention, the input gateway computer 214a may deliver the transaction request 404a to the asynchronous communications channel for storage in a request queue in the shared transaction cache/memory 220. Because the request queue may be accessible by both first processing stages 218a, 219a in silos 212a, 212b, the transaction request 404 may be stored in transaction cache/memory 220 with information designating the first processing stage 218a of the first silo 212a. Likewise, the transaction request 404 may be stored with any context information needed (e.g., parameter values) when the first processing stage 218a processes the transaction request 218. The delivery of the transaction request 402a to the request queue of the shared transaction cache/memory 220 may trigger an event or request for processing by the first processing stage 218a; however, the request 404a will be processed by the first processing stage 218a in turn based upon its position in the request queue.

At block 520, when the first processing stage 218a finishes any other required processing, it will retrieve or receive the transaction request 404a (which designates the first silo 212a and/or first processing stage 218a of the first silo 212a) from the shared request queue in shared transaction cache/memory 220 for processing. The first processing stage 218a may receive or retrieve the transaction request 404a based upon its designation of the first processing stage 218a of the first silo 212a. When the first processing stage 218a finishes processing the transaction request 404a, the result of the processing will be delivered as a transaction request 404b (with any contact information) to the asynchronous communications channel, which will deliver the transaction request 404b to the shared request queue accessible by the second processing stage 218b of the first silo, as illustrated by block 525. The transaction request 404b may designate the next processing stage 218b of the first silo 212a.

At block 530, a determination is made as to whether the next processing stage (e.g., stage 218b in the first silo 212a) is operating properly. If block 530 determines that the next processing stage is operating properly, then processing proceeds to block 535, where the current silo for processing the transaction request 404b will remain the first silo 212a. On the other hand, in the embodiment of FIG. 4, the next processing stage 218b may be disabled, downed, hung, or not functioning properly or in a timely manner. Accordingly, the messaging service in the second silo 212b may determine in block 530 that the next processing stage 218 is not operating properly, in which case processing may proceed to block 540. At block 540, the messaging service may make a determination as to whether a corresponding processing stage is available and properly functioning in another silo. For example, in the embodiment of FIG. 4, the next processing stage 219b of the second silo 212b may be available and properly functioning. The next processing stage 219b of the second silo 212b may have substantially identical processing functions or capabilities (as well as potentially identical hardware capabilities in some embodiments) as the processing stage 218a of the first silo 212a. Accordingly, since the next processing stage 219b of the second silo 212b may be available and properly functioning, processing may proceed to block 545.

At block 545, the current silo for processing the transaction request 404b may be changed from the first silo 212a to the second silo 212b to reflect that one or more stages of the first silo 212a may be disabled, downed, hung, or not functioning properly or in a timely manner. If at block 540 a next processing stage is not available in another silo, then the processing may stop.

At block 550, when the second processing stage 219b finishes any required processing, it will retrieve or receive the transaction request 404b from the shared request queue in shared transaction cache/memory 220 for processing. When the second processing stage 219b of the second silo 212b finishes processing the transaction request 404b, the result of the processing will be delivered as a transaction request 404n (with any contact information) to the asynchronous communications channel, and processing may proceed to block 555. At block 555, a determination may be made as to whether any processing stages are remaining. If one or more processing stages are remaining, then processing can return to block 525, where the transaction request 404n can be delivered to shared request queue accessible by the nth processing stage 219n of the second silo 212b, and similar processing may follow according to the blocks described above. Virtually any number of processing stages may be available between the processing stages 218b, 219b and nth processing stages 218n, 219n. In an alternative embodiment, the processing stages 218b, 219b may be the last processing stages, according to an example embodiment of the invention.

Once block 555 determines that the final processing stage 219n has been reached, then processing may proceed to block 560. At block 560, the result of processing by the final processing stage 219n may be delivered as a transaction request 406 to the asynchronous communications channel. At block 560, the messaging service may deliver the transaction request 406 to the output gateway computer 216b, which will in turn deliver the transaction request 406 to an external service computer 106a-n as transaction request 408.

It will be appreciated that the output gateway computers, including gateway computer 216b, can communicate with an external service computer 106a-n using synchronous or asynchronous communications, depending upon the respective configuration of the external service computer 106a-n. Example synchronous communications can be utilized with one or more external service computers 106a-n configured to communicate through web services, file transfer protocol, etc. It will be appreciated that for synchronous communication, a communications channel can be maintained between a gateway computer such as gateway computer 216b and the external service computer 106a until the external service computer 106a-n provides a transaction response, or until a time-out occurs (e.g., a predetermined time such as 60 seconds without receiving the transaction response). The transaction response 410 may indicate a result of the external service computer 106a-n processing the transaction request 408. On the other hand, example asynchronous communications can be utilized with one or more external service computers 106a-n configured to utilize queues or tickets, according to an example embodiment of the invention. For example, if the external service computer 106a-n utilizes a queue, then the transaction request 408 will be delivered in the queue, and will be processed in turn by the external service computer 106a-n. The external service computer 106a-n may then deliver the transaction response 410 in due course to the processing computer 305a-n. Similarly, a ticket number may have been assigned when the transaction request 408 was delivered to the external service computer 106a-n, and a gateway computer such as gateway computer 216b may return at a subsequent time to obtain the result of processing the transaction request 408 using the ticket number. Many variations of the synchronous and asynchronous communications are available without departing from example embodiments of the invention.

It will be appreciated that when a transaction response 410 is received by the gateway computer 216b from an external service computer 106a-n, it may trigger an event for a set of processing stages of the processing node cluster of the second silo 212b. Accordingly, the transaction response 410 may be delivered by the gateway computer 216b to the asynchronous communications channel as transaction response 412n for storage in the shared transaction cache/memory 220, as previously described herein. In this regard, the processing may be similar to that previously described with respect to FIG. 5 in which the plurality of processing stages 219a-n may retrieve, deliver, and/or process the transaction responses 412a-n. Once the processing stage 219a finishes processing the transaction response 219a, the result of processing by the processing stage 219a may be delivered as a transaction response 414 to the asynchronous communications channel. The asynchronous communications channel can then deliver the transaction response 414 from the second silo 212b to the input gateway computer 214a of the first silo 212a since the initial transaction originated from the first silo 212a. Alternatively, while not illustrated, the asynchronous communications channel can deliver the transaction response 414 to the input gateway computer 214b, which may in turn deliver the transaction response 414 to the input gate computer 214a. The input gateway computer 214a of the first silo 212a may then deliver or direct the delivery of the transaction response 414 to the initial external event source computer 102 that originated the transaction request that corresponds to the response 414.

It will be appreciated that many variations of FIGS. 4 and 5 are available without departing from example embodiments of the invention.

The invention is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices.

It will also be appreciated that each of the I/O interfaces described herein may facilitate communication between a processor and various I/O devices, such as a keyboard, mouse, printer, microphone, speaker, monitor, bar code readers/scanners, RFID readers, and the like. Likewise, each of the network interfaces described herein may take any of a number of forms, such as a network interface card, a modem, a wireless network card, and the like.

It will further be appreciated that while certain computers have been illustrated herein as a single computer or processor, the illustrated computers may actually be comprised of a group of computers or processors, according to an example embodiment of the invention.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A computer-implemented method, comprising:
   providing a first silo comprising a first cluster of one or more first computers configured to operate a first set of event-driven processing stages;
   providing a second silo comprising a second cluster of one or more second computers configured to operate a second set of event-driven processing stages, wherein the first and second sets of processing stages include substantially identical processing stages such that during normal operations of the first and second silos, transactions are allocated between the first and second silos;
   arranging at least one shared transaction cache between the first set of processing stages and the second set of processing stages of the respective first and second silos, wherein the at least one transaction cache stores one or more transactions designated for processing by respective processing stages of the first set or the second set,
   wherein each processing stage of the first and second sets of processing stages can obtain or receive one or more transactions from the at least one shared transaction cache for processing,
   wherein when a distressed processing stage in the first silo fails to process a first transaction designated for the distressed processing stage in a predefined amount of time, a non-distressed processing stage in the second silo obtains or receives the first transaction from the at least one shared transaction cache to process the first transaction on behalf of the distressed processing stage.

2. The method of claim 1, wherein the distressed processing stage and non-distressed processing stage have substantially identical processing logic.

3. The method of claim 1, wherein the first processing silo and the second processing silo are physically located at a same data center.

4. The method of claim 1, wherein a messaging service is utilized to deliver one or more transactions between the at least one shared transaction cache and each processing stage of the first and second sets of processing stages.

5. The method of claim 4, wherein the messaging service provides an asynchronous communications channel for delivering one or more transactions between the at least one shared transaction cache and each processing stage of the first and second sets of processing stages.

6. The method of claim 1, wherein the first and second silos are replicated silos having substantially identical functions, and are operative to process respective transactions in parallel during normal operations.

7. The method of claim 1, wherein a result of the first transaction being processed by the non-distressed processing stage is provided to the at least one transaction cache as a second transaction request for processing by the second silo.

8. The method of claim 1, wherein the non-distressed processing stage of the second set is a final processing stage of the second set, wherein the second transaction request is designated for delivery to an external service computer.

9. The method of claim 1, wherein the first transaction is triggered based at least in part upon receipt of a healthcare transaction request from an external event source computer by a load balancer computer in communication with the first silo and the second silo.

10. The method of claim 1, wherein the healthcare transaction request is at least one of: (i) an eligibility verification request, (ii) a preauthorization request, or (iii) a claim status request.

11. A system, comprising:
   at least one memory for storing computer-executable instructions; and
   at least one processor in communication with the at least one memory, wherein the at least one processor is configured to execute the computer-executable instructions to:
      provide a first silo comprising a first cluster of one or more first computers configured to operate a first set of event-driven processing stages;
      provide a second silo comprising a second cluster of one or more second computers configured to operate a second set of event-driven processing stages, wherein the first and second sets of processing stages include substantially identical processing stages such that during normal operations of the first and second silos, transactions are allocated between the first and second silos;

arrange at least one shared transaction cache between the first set of processing stages and the second set of processing stages of the respective first and second silos, wherein the at least one transaction cache stores one or more transactions designated for processing by respective processing stages of the first set or the second set, wherein each processing stage of the first and second sets of processing stages can obtain or receive one or more transactions from the at least one shared transaction cache for processing, wherein when a distressed processing stage in the first silo fails to process a first transaction designated for the distressed processing stage in a predefined amount of time, a non-distressed processing stage in the second silo obtains or receives the first transaction from the at least one shared transaction cache to process the first transaction on behalf of the distressed processing stage.

12. The system of claim 11, wherein the distressed processing stage and non-distressed processing stage have substantially identical processing logic.

13. The system of claim 11, wherein the first processing silo and the second processing silo are physically located at a same data center.

14. The system of claim 11, wherein a messaging service is utilized to deliver one or more transactions between the at least one shared transaction cache and each processing stage of the first and second sets of processing stages.

15. The system of claim 14, wherein the messaging service provides an asynchronous communications channel for delivering one or more transactions between the at least one shared transaction cache and each processing stage of the first and second sets of processing stages.

16. The system of claim 11, wherein the first and second silos are replicated silos having substantially identical functions, and are operative to process respective transactions in parallel during normal operations.

17. The system of claim 11, wherein a result of the first transaction being processed by the non-distressed processing stage is provided to the at least one transaction cache as a second transaction request for processing by the second silo.

18. The system of claim 11, wherein the non-distressed processing stage of the second set is a final processing stage of the second set, wherein the second transaction request is designated for delivery to an external service computer.

19. The system of claim 11, wherein the first transaction is triggered based at least in part upon receipt of a healthcare transaction request from an external event source computer by a load balancer computer in communication with the first silo and the second silo.

20. The system of claim 11, wherein the healthcare transaction request is at least one of: (i) an eligibility verification request, (ii) a preauthorization request, or (iii) a claim status request.

* * * * *